Dec. 26, 1967  D. L. PLATUS ET AL  3,360,080
ENERGY ABSORBING DEVICE
Filed Sept. 23, 1966  2 Sheets-Sheet 1
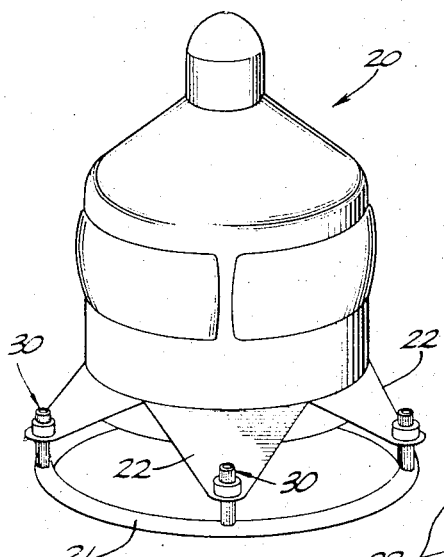
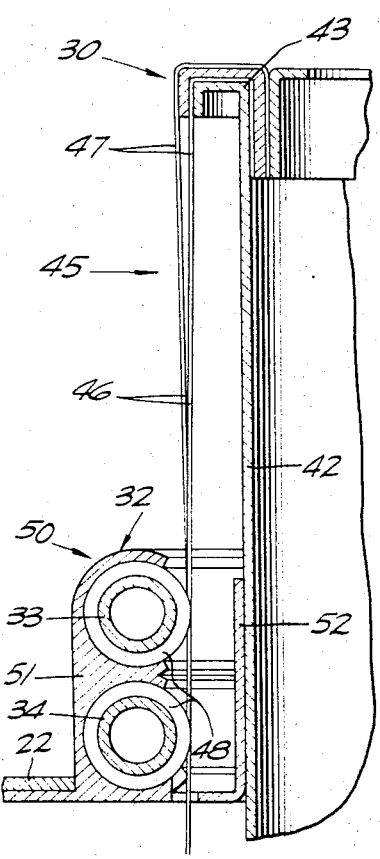
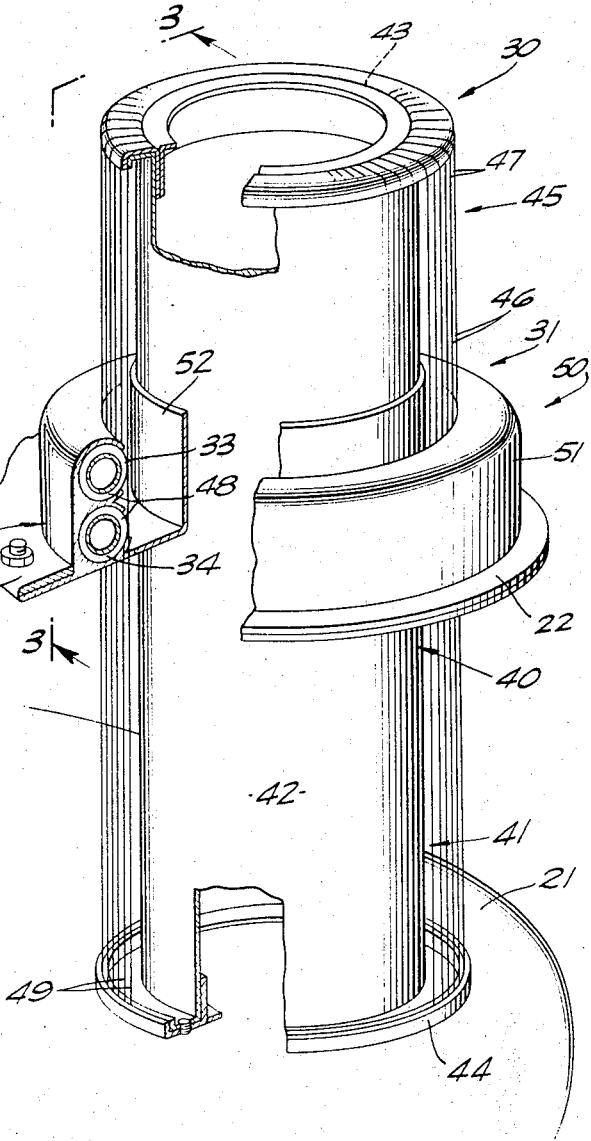
DAVID L. PLATUS
FRANK A. MAROVICH
PATRICK J. CUNNINGHAM
INVENTORS
BY Herzig, Walsh & Blackham
ATTORNEYS Dec. 26, 1967 D. L. PLATUS ET AL 3,360,080
ENERGY ABSORBING DEVICE
Filed Sept. 23, 1966 2 Sheets-Sheet 2

DAVID L. PLATUS
FRANK A. MAROVICH
PATRICK J. CUNNINGHAM
INVENTORS

BY Herzig, Walsh + Blackham
ATTORNEYS

United States Patent Office 3,360,080
Patented Dec. 26, 1967

3,360,080
ENERGY ABSORBING DEVICE
David L. Platus, Covina, Frank A. Marovich, Hacienda Heights, and Patrick J. Cunningham, Fullerton, Calif.; said Marovich assignor to Ara, Inc., West Covina, Calif., a corporation of California
Filed Sept. 23, 1966, Ser. No. 581,480
4 Claims. (Cl. 188—1)

ABSTRACT OF THE DISCLOSURE

An energy absorbing device absorbs unidirectional mechanical energy by cyclic plastic deformation and includes a serrated column having serrations engaged by teeth at the ends of a pair of rocker arms adapted to be rocked when the column is moved with respect to the arms. Straps connect the ends of the arms together and are subjected to plastic tension deformation when associated ends of arms engage a crown on the column and to plastic compression deformation when the associated ends engage a valley.

---

In general, the present invention relates to a lightweight, high-energy absorbing device of the type disclosed in FIGURES 13 and 14 of Patent No. 3,231,049. More particularly, the present invention relates to an energy absorbing device adapted to absorb unidirectional mechanical energy by the cyclic plastic deformation of a solid material. As used in the present application, the term "mechanical energy" may be defined according to its conventional definition, i.e., a force acting through a distance. Thus the term "mechanical energy" includes not only the kinetic energy associated with a moving body, but also the energy associated with situations, such as relieving the overload on a structure without damage to the structure. Also, as used in the present application, the term "cyclic plastic deformation" refers to the deformation of any solid material around a hysteresis curve, as illustrated in FIGURE 21 of said patent.

At present, there are a wide variety of energy absorbing devices known which are adapted to cushion the impact of the thing being protected when it is required to bring it to a sudden stop. A common example of such energy absorbing devices are conventional hydraulic-mechanical devices, such as dashpots. However, such conventional hydraulic-mechanical energy absorbing devices are capable of absorbing relatively limited amounts of energy during a single impact and are relatively heavy, bulky devices. For example, a typical hydraulic-mechanical device now on the market has the capacity of absorbing 1,000 foot pounds of energy per pound of weight during a single impact. Because of the low capacity and high weight of such conventional hydraulic-mechanical devices, energy absorbing devices have been developed which achieve very high specific energy absorption, i.e., large values of foot pounds of energy absorbed per pound of weight of the device, but such devices usually require their substantial destruction during the course of a single impact. The most efficient such single impact energy absorption device now known is probably the frangible tube device having a specific energy absorption of about 30,000 foot pounds per pound, although similar devices, such as crushable materials and gas-filled collapsible shells are known. However, such single impact devices have only very limited usefulness because they require replacement after usually one use and thus are not suitable in any situation which would require several impacts.

In general, therefore, an object of the present invention is a lightweight, high-energy absorbing device which may be utilized to cushion a substantial number of impacts.

Another object of the present invention is an energy absorbing device adapted to absorb unidirectional mechanical energy by cyclic plastic deformation of solid materials.

Still another object of the present invention is an energy absorbing device wherein the cyclic plastic deformation includes substantially tension deformation and compression deformation.

Still another object of the present invention is an energy absorbing device including a cycling and energy absorbing means comprising at least one strap which is subjected to cyclic plastic tension deformation and compression deformation during an energy absorbing operation.

Other objects and advantages of the present invention will be readily apparent from the following description and drawings which will illustrate at least one preferred exemplary embodiment of the present invention.

In general, the present invention involves an energy absorbing device which comprises an energy absorbing means and an energy transmitting means for imposing on such energy absorbing means a deformation and its reverse deformation in response to mechanical energy applied thereto. Operatively associated with both of said means is a cycling means for converting unidirectional mechanical energy applied to said energy transmitting means into cyclic plastic tension deformation and compression deformation of said energy absorbing means. At least two of said means may be combined into a single means for performing all of the functions of each of said means being combined.

In order to facilitate understanding of the present invention, reference will now be made to the appended drawings of a preferred specific embodiment of the present invention. Such drawings should not be construed as limiting the invention which is properly set forth in the appended claims.

In the drawings:

FIGURE 1 is a perspective view of an apparatus incorporating a specific embodiment of the energy absorbing device of the present invention.

FIGURE 2 is an enlarged perspective view partially broken away of the energy absorbing device portion of FIGURE 1.

FIGURE 3 is a cross-sectional view of FIGURE 2 taken along the lines 3—3 of FIGURE 2.

Figure 4:
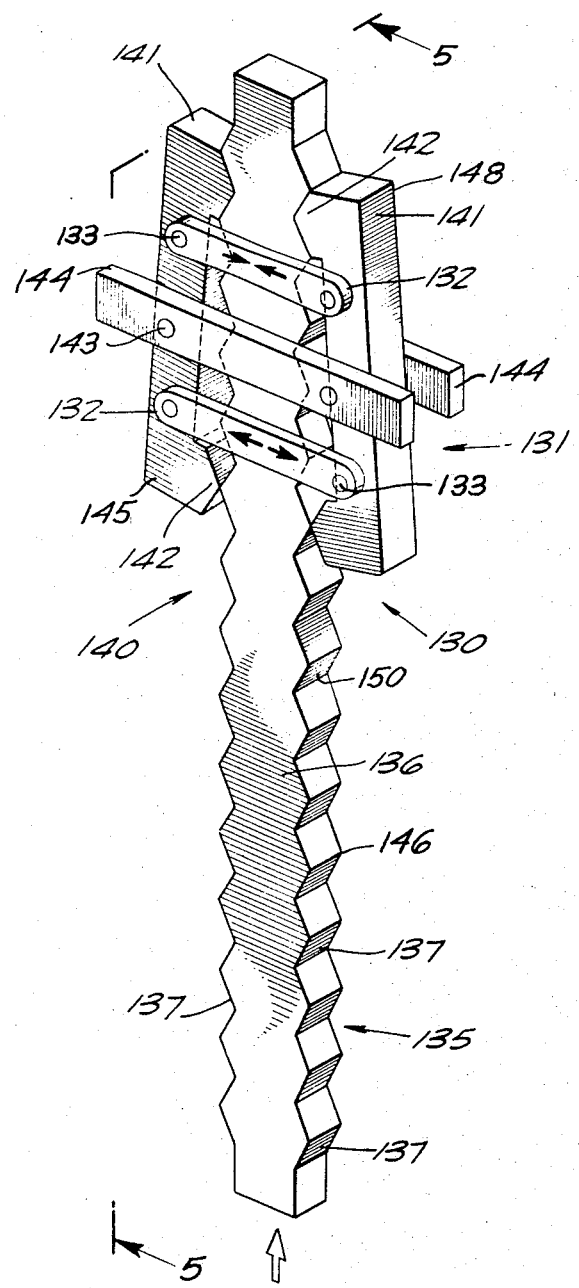
FIGURE 4 is a perspective view of another embodiment of the energy absorbing device of the present invention.

As illustrated in FIGS. 1–3, one embodiment of the present invention involves energy absorbing devices 30 which are used to cushion an instrument package 20 having a base ring 21 and a series of legs 22 which are connected to the base ring 21 by means of energy absorbing devices 30. The energy absorbing devices 30 include, generally, a cycling and energy absorbing means 31 and an energy transmitting means 40. The energy transmitting means 40 imposes on the cycling and energy absorbing means 31 a deformation and its reverse deformation in response to kinetic energy applied thereto. The cycling and energy absorbing means 31 is adapted to convert unidirectional kinetic energy applied to the energy transmitting means 40 into its cyclic plastic deformation and reverse deformation. The cycling and energy absorbing means 31 comprises a toroidal member 32 consisting essentially of a pair of tori 33 and 34. The energy transmitting means 40 comprises a column means 41 which is movable and coaxial with respect to the toroidal member 32. Between the column means 41 and the toroidal member 32 are connecting means 45 for rotating the toroidal member 32 by movement of the column means 41. Holding the toroidal member 32 and maintaining it in alignment with the column means 41 is a support means 50. The column means 41 comprises simply a tube 42 which is connected directly to the base ring 21 of the instrument package 20. Similarly, the support means 50 comprises simply a housing 51 which is joined to the legs 22 of the instrument package 20 and in which the tori 33 and 34 are loosely positioned. In addition, the support means 50 includes a sleeve 52 for maintaining the alignment of a column 41 with respect to the toroidal member 32. The tube 42 is slidably mounted in the sleeve 52 of the support means 50.

The connecting means 45 comprises a series of cords 46 spaced around the circumference of the toroidal member 32. Each of the cords 46 has its first end 47 attached to the free end 43 of the tube 42, its central portion 48 wound around at least one of the tori 33 or 34, and its second end 49 attached to the connected end 44 of the tube 42. Each cord 46 simply grasps the torus 33 or 34 by a capstan action.

When the instrument package 20 strikes the ground, the base ring 21 is jolted towards the legs 22. Such impact is translated through the tubes 42 along the cords 46 to tori 33 and 34 to the housing 51. However, in the course of such translation of the impact, the cords 46 cause the tori 33 and 34 to rotate about their internal axes as the cords 46 concurrently wind onto and unwind therefrom. Such concurrent winding and unwinding action of the cords 46 result in the portion 48 of the cords 46 wound around the torus 33 or 34 being moved from the first end 47 of the cords 46 to the second end 49 of the cords 46. The rotation of the tori 33 and 34 causes cyclic plastic tension deformation and compression deformation thereon and thus results in an absorption of energy which increases the temperature of the tori 33 and 34.

A design analysis was carried out for a landing impact system, as illustrated in FIGS. 1–3, which was adapted to decelerate a 7,000-pound vehicle from an impact velocity of 32.8 feet per second, with an average deceleration of 10 G. As illustrated, four energy absorbing devices were utilized so that an impact force of 17,500 pounds per device was required. It should be noted that the impact velocity was selected to give a stroke length of 20 inches, i.e., movement of the tube 41 with respect to the housing 51 is approximately 20 inches.

For simplicity, the system was designed for a single impact with the tori revolving through 20 cycles and rising about 1000° F. in temperature during the impact. A list of the design parameters for each component was set up as follows:

347 stainless steel torus tubes:
| | |
|---|---|
| Tube diameter, in. | 0.30 |
| Average radius of the torus, in. | 1.80 |
| Tube wall thickness, in. | 0.048 |
| Fatigue parameter, C (550° F. average temperature) | 0.75 |
| Average flow stress, p.s.i. | 53,000 |
| Specific weight, p.c.i. | 0.29 |
| Heat capacity, B.t.u./lb. ° F. | 0.12 |
| Total weight of the two tori, lb. | 0.297 |

Aluminum alloy column:
| | |
|---|---|
| Length, in. | 20 |
| Radius, in. | 1.60 |
| Wall thickness, in. | 0.0266 |
| Yield strength, p.s.i. | 78,000 |
| Young's modulus, E, p.s.i. | $10.6 \times 10^6$ |
| Critical strength, p.s.i. | 65,300 |
| Specific weight, p.c.i. | 0.10 |
| Total weight, lb. | 0.535 |

Steel cords:
| | |
|---|---|
| Yield strength, p.s.i. | 400,000 |
| Specific weight, p.c.i. | 0.30 |
| Total weight, lb. | 0.263 |

For the column design, Euler's equation was used for simplicity with the assumptions: (1) the proportional limit is ¾ of the yield strength, and (2) the slenderness ration to reach yield is ⅔ that required to reach the proportional limit. A safety factor of 1.25 was applied to the above weights in order to arrive at a more realistic design value. The weight breakdown on such basis is as follows:

| | Lb. |
|---|---|
| Working elements | 0.371 |
| Column | 0.669 |
| Steel cords | 0.328 |
| Sleeve bearings and attachment | 0.371 |
| Total | 1.74 |

The total impact energy for a single energy absorbing device as described above is 29,200 ft.-lb., giving a total specific energy absorption for the device, i.e.

$$\frac{29,200}{1.74} = 16,800 \text{ ft.-lb./lb.}$$

The total weight of the four devices which make up the impact system, excluding the weight of attachments, is 7 lbs. or 0.1% of the vehicle weight.

Figure 5:
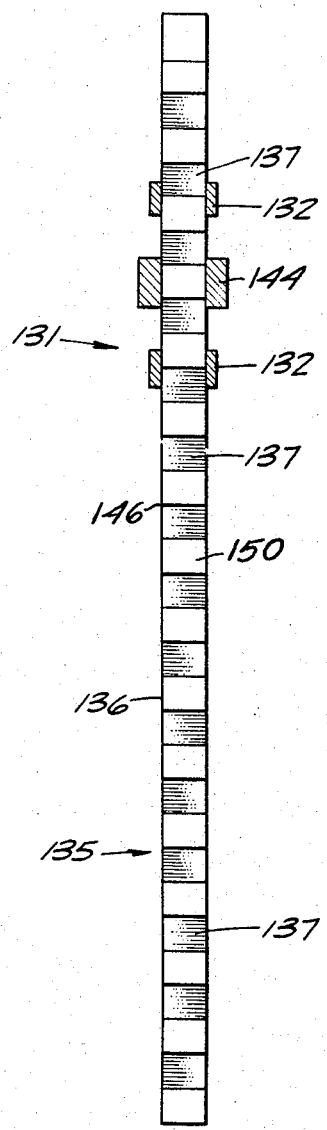
FIGURE 5 is a cross-sectional view of FIGURE 4 taken along the lines 5—5 of FIGURE 4.

Another embodiment of the present invention is illustrated in FIGS. 4 and 5. In FIGS. 4 and 5 the energy absorbing device 130 comprises an energy absorbing means 131 comprising an elongatable body means in the form of a set of straps 132. The energy transmitting means 135 comprises a column 136 having a series of serrations 137. The cycling means 140 comprises a pair of rocker arms 141 connected to the ends of the straps 132 by associated pins 133 and engaged with the column serrations 137 of the column 136 by means of teeth 142. The rocker arms 141 are adapted to move along the axis of the column 136 and to rock on associated pins 143 which are connected to a pair of plates 144. The lower ends 145 of arms 141 are spread apart when an associated tooth 142 engages a crown 146 on the serrations 137 and are moved toward each other when the teeth 142 on the upper ends 148 of arms 141 engage a crown 146 while the teeth 142 on the ends 145 simultaneously engage a valley 150. This action imposes cyclic plastic tension deformation and compression deformation on the straps 132 during movement of cycling means 140 along the column 136. Thus, the lower strap 132 is subjected to plastic tension deformation when the ends 145 move apart. The upper strap 132 is simultaneously subjected to plastic compression deformation 64 the moving of ends 148 toward each other. The lower strap 132 is then subjected to plastic compression deformation when the ends 145 are moved toward each other while the upper strap 132 is subjected to plastic tension deformation as the ends 148 move away from each other.

As set forth above, the energy absorption device of the present invention includes an energy absorbing means which is subjected to cyclic plastic tension deformation and a reversed compression deformation. Thus, any deformable solid material which exhibits a hysteresis curve may be utilized in the present invention. The area enclosed within a hysteresis curve loop represents the energy absorbed during the course of one cycle of cyclic plastic deformation. The materials which may be used in the present invention include not only metals, such as steel, copper, titanium, brass, etc., but also nonmetals, such as plastics, natural and synthetic rubbers and elastomers of various kinds, such as polyurethane elastomers.

It will be understood that the foregoing description and examples are only illustrative of the present invention and it is not intended that the invention be limited thereto.

All substitutions, alterations and modifications of the present invention which come within the scope of the following claims or to which the present invention is readily susceptible without departing from the spirit and scope of this disclosure are to be considered part of the present invention.

What is claimed is:

1. An energy absorbing device adapted to absorb unidirectional mechanical energy by cyclic plastic deformation comprising:
   (a) an energy absorbing elongate extensible and compressible means;
   (b) an energy transmitting means for imposing on said energy absorbing means alternate plastic tension deformation and plastic compression deformation in response to mechanical energy applied to said transmitting means approximately normal to the elongate axis of said absorbing means; and
   (c) cycling means interconnecting said transmitting means and said absorbing means for converting mechanical energy applied to said energy transmitting means into plastic tension deformation and plastic compression deformation of said energy absorbing means, alternately, along said axis.

2. A device as stated in claim 1 wherein:
said energy absorbing means comprises an elongatable body means;
said energy transmitting means comprises column means; and
said cycling means comprises rocker means connected to the ends of said body means and engaged with said column means, said rocker means being adapted to move along said column means and to be rocked thereby for imposing cyclic plastic tension deformation and compression deformation on said body means.

3. A device as stated in claim 1 wherein:
said energy absorbing means comprises strap means;
said energy transmitting means comprises serrated column means; and
said cycling means comprises rocker arm means connected to the ends of said strap means and engaged with said column means, said rocker arm means being adapted to move along the axis of said column means and to impose cyclic plastic tension deformation and compression deformation on said strap means.

4. A device as stated in claim 1 wherein:
said energy transmitting means comprises a serrated column having serrations forming a plurality of crowns and valleys axially along said column;
said cycling means comprises a pair of rocker arms, each of said arms having a first tooth at one end and a second tooth at another end, said teeth being engageable with said valleys and said crowns during movement of said rocker arms along said column, said cycling means including means rockably connecting said rocker arms together in operative association with said serrations, whereby said ends of said arms may be moved together when associated teeth engage a valley and may be moved apart when said associated teeth engage a crown; and
said energy absorbing means comprises a first strap connecting said one ends of said arms together and a second strap connecting said other ends of said arms together, said straps being subjected to plastic tension deformation when associated ends of said arms engage a crown and being subjected to plastic compression deformation when said associated ends engage a valley.

References Cited
UNITED STATES PATENTS
2,819,063    1/1958    Neidhart.
3,031,034    4/1962    Thomas _____ 188—129

DUANE A. REGER, *Primary Examiner.*